US010389551B2

(12) United States Patent
Hollander et al.

(10) Patent No.: US 10,389,551 B2
(45) Date of Patent: Aug. 20, 2019

(54) NETWORK FOR AN AIRCRAFT OR SPACECRAFT, AN AIRCRAFT OR SPACECRAFT, AND A METHOD FOR CONFIGURING A NETWORK

(71) Applicant: Airbus Operations GmbH, Hamburg (DE)

(72) Inventors: Jens Hollander, Hamburg (DE); Holger Heitsch, Hamburg (DE); Daniel Kliem, Hamburg (DE); Martin Wagner, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 178 days.

(21) Appl. No.: 15/346,823

(22) Filed: Nov. 9, 2016

(65) Prior Publication Data

US 2017/0134184 A1 May 11, 2017

(30) Foreign Application Priority Data

Nov. 9, 2015 (EP) .................................... 15193751

(51) Int. Cl.
*H04L 12/403* (2006.01)
*H04L 7/00* (2006.01)
(Continued)

(52) U.S. Cl.
CPC .......... *H04L 12/403* (2013.01); *H04L 7/0041* (2013.01); *H04L 41/0816* (2013.01); *H04L 67/12* (2013.01); *H04L 2012/4028* (2013.01)

(58) Field of Classification Search
CPC . H04L 12/403; H04L 41/0816; H04L 7/0041; H04L 67/12
See application file for complete search history.

(56) References Cited

U.S. PATENT DOCUMENTS 6,044,086 A 3/2000 Albrow
6,279,139 B1 * 8/2001 Miyasita .............. H04L 1/0041 714/801

(Continued)

FOREIGN PATENT DOCUMENTS

DE 10 2011 076 357 B4 10/2014
EP 1032165 A1 8/2000

(Continued)

OTHER PUBLICATIONS

Extended European Search Report for Application No. 15193751 dated Apr. 22, 2016.

(Continued)

*Primary Examiner* — Walter J Divito
*Assistant Examiner* — Anthony Luo
(74) *Attorney, Agent, or Firm* — Jenkins, Wilson, Taylor & Hunt, P.A.

(57) ABSTRACT

A network for an aircraft including a master device and slave devices connected in daisy-chain arrangement series. Each slave device has a unique identifier. The master transmits polling data packets along the slave devices, each including only one identifier. Polling data packets are transmitted in successive sequences, each including for each slave device only one polling data packet and including the polling data packets in a predetermined order. Each slave device includes a first data interface for connection in an upstream direction, a second data interface for connection in the downstream direction, and a processing unit to compare for each received polling data packet the identifier thereof with the identifier of the respective slave device, and output a response data packet to the master device if the two identifiers match, and forward the polling data packet to the second interface at least if the two identifiers do not match.

11 Claims, 7 Drawing Sheets

(51) Int. Cl.

| | |
|---|---|
| ***H04L 12/24*** | (2006.01) |
| ***H04L 12/40*** | (2006.01) |
| ***H04L 29/08*** | (2006.01) |

(56) References Cited

U.S. PATENT DOCUMENTS

| | | | | |
|---|---|---|---|---|
| 7,349,420 | B1 * | 3/2008 | Toth | H04L 12/2856 370/437 |
| 8,838,296 | B2 | 9/2014 | Fischer et al. | |
| 2003/0210030 | A1 * | 11/2003 | Korger | G01R 31/3016 324/76.54 |
| 2006/0086893 | A1 | 4/2006 | Spanier et al. | |
| 2008/0123606 | A1 | 5/2008 | Takizawa | |
| 2009/0325578 | A1 | 12/2009 | Li et al. | |
| 2010/0189006 | A1 * | 7/2010 | Mallick | H04W 36/385 370/252 |
| 2012/0250682 | A1 | 10/2012 | Vincent et al. | |
| 2013/0170451 | A1 | 7/2013 | Krause et al. | |
| 2013/0259049 | A1 | 10/2013 | Mizrahi | |
| 2014/0128026 | A1 * | 5/2014 | Raleigh | G06Q 50/06 455/406 |
| 2014/0333207 | A1 | 11/2014 | Saes | |
| 2015/0061587 | A1 | 3/2015 | Bruechmann et al. | |
| 2015/0372717 | A1 * | 12/2015 | Schrum, Jr. | H04B 3/542 370/458 |
| 2016/0323312 | A1 * | 11/2016 | Voelker | H04L 63/08 |
| 2017/0134312 | A1 | 5/2017 | Heitsch | |

FOREIGN PATENT DOCUMENTS

| | | | |
|---|---|---|---|
| EP | 1760563 | A1 | 3/2007 |
| EP | 2670098 | A1 | 12/2013 |
| EP | 3166261 | B1 | 1/2019 |
| WO | WO 2009/081128 | A1 | 7/2009 |

OTHER PUBLICATIONS

Extended European Search Report for Application No. 15193763 dated Apr. 25, 2016.

Non-Final Office Action for U.S. Appl. No. 15/347,446 dated Jun. 20, 2018.

Final Office Action for U.S. Appl. No. 15/347,446 dated Dec. 14, 2018.

Interview Summary for U.S. Appl. No. 15/347,446 dated Dec. 28, 2018.

* cited by examiner

NETWORK FOR AN AIRCRAFT OR SPACECRAFT, AN AIRCRAFT OR SPACECRAFT, AND A METHOD FOR CONFIGURING A NETWORK

CROSS-REFERENCE TO RELATED APPLICATION

This application claims priority to European Patent Application No. 15193751.3 filed Nov. 9, 2015, the entire disclosure of which is incorporated herein by reference.

TECHNICAL FIELD

The present application relates to a network for an aircraft or spacecraft, comprising a master device and a plurality of slave devices connected in series in a daisy-chain arrangement, to an aircraft comprising such a network, and to a method of configuring such a network.

BACKGROUND

Due to its simplicity, a so-called daisy-chain topology or arrangement is used in many applications when setting up data networks. For example, such data networks are used in aircraft, such as, e.g., aircraft cabin electronic networks. In these networks it is frequently necessary to add or remove network devices or nodes to or from the network, and it is desirable to keep the reconfiguration work at a minimum.

In a daisy-chain arrangement the various network devices or nodes are connected in series such that they are arranged one after the other. Messages are transmitted along the series by forwarding the messages from network device to network device until the target network device is reached. Often, the daisy-chain arrangement comprises at one of its ends a master device and a plurality of slave devices connected to the master device. The master device transmits polling messages to the slave devices, wherein the slave devices are addressed by separate polling messages and one after the other in a defined order or sequence. This polling is repeated continuously. Each of the slave devices analyzes the received polling messages in order to determine whether it is the intended recipient of the polling message, and transmits a response message to the master device if it is the intended recipient. Otherwise, the polling message is forwarded to the next slave device, if present. Thus, each polling message starts the transmission phase of the slave device, which is the intended recipient of the respective polling message.

Due to the need to analyze the polling messages and to then generate response messages or forward the polling messages, delays occur and accumulate along the chain. Both the processing time for generating a response message and the processing time for forwarding a polling message contribute to these delays, which delays have to be taken into consideration every time when designing, setting up or reconfiguring a daisy-chain network in order to avoid collisions.

Other types of networks, e.g., having star topologies do not suffer to such an extent from delays, but have a higher wiring complexity and are, consequently, associated with higher weights due to longer data lines.

SUMMARY

It is an object of the present disclosure to provide a network having a daisy-chain arrangement and for which setting up and reconfiguring the network is particularly simple.

This object is achieved, for example, by the features disclosed herein.

According to the present disclosure a network for an aircraft or spacecraft is provided, which data network comprises a master device and a plurality of slave devices. The master device and the slave devices are connected in series in a daisy-chain arrangement using, e.g., one or more wires between adjacent devices. The master device is connected to a first one of the slave devices, and the remaining slave devices—up to a last one of the slave devices—are connected in series to the first slave device. Each of the slave devices has an associated identifier or address taken from a predetermined ordered sequence of identifiers and uniquely identifying the respective slave device among the plurality of slave devices. For example, the identifiers may be numbers.

The master device is configured or adapted to transmit periodically, i.e., in predetermined time intervals, polling data packets in a downstream direction along the series of slave devices. Each of the polling data packets includes one and only one identifier and, in particular, the identifier of one and only one of the slave devices, and may optionally also include user data for the slave device addressed by the identifier. However, as will be explained below it may also be preferable if some of the polling data packets include a predefined identifier which is not associated with any of the slave devices. The master device transmits the polling data packets in successive sequences, wherein each of these sequences of polling data packets includes for each of the slave devices one and only one polling data packet, i.e., one and only one polling data packet including the identifier of the respective slave device. Further, each of the sequences of polling data packets includes the polling data packets in the order defined by the predetermined sequence of identifiers, so that the slave devices are polled in the order corresponding to the order of the identifiers, which is typically not the order of the slave devices along the chain. Each of the polling data packets is preferably transmitted in another time slot. Further, successive sequences of polling data packets are preferably transmitted immediately after each other, so that the periodicity of the transmission of polling data packets is maintained between the sequences, i.e., the same predetermined polling time interval exists between each two successive polling data packets within a sequence and between the last polling data packet of a one sequence and the first polling data packet of the next sequence.

Moreover, each of the slave devices comprises a first data interface by which it is connected—depending on whether it is the first slave device or another slave device in the series of slave devices—to the master device or to an adjacent slave device in an upstream direction, a second data interface by which it is connected to an adjacent slave device in the downstream direction (if present, i.e., if it is not already the last slave device), and a programmable or non-programmable processing unit connected to the first and second data interfaces. Each of the first and second data interfaces is a bidirectional or preferably full-duplex data interface allowing input of data to and output of data from the respective slave device. The first and second data interfaces preferably comprise one or more respective terminals to which one or more wire can be coupled.

The processing unit is configured or adapted to compare, for each polling data packet received on the first data interface, the identifier of the slave device to which the respective processing unit belongs with the identifier included in the respective polling data packet. If it is determined that the two identifiers match, the processing unit outputs on the first data interface a response data packet, which may be generated by the processing unit or another component of the slave device, to the master device, i.e., along the sequence of slave devices in the direction towards the master device. Further, the polling data packet is preferably output on the second data interface. In any case, if the two identifiers do not match the polling data packet is output on the second data interface.

The processing unit is further configured or adapted to forward response data packets received on the second data interface to the first data interface, i.e., the response data packets received from downstream slave devices are forwarded towards the master device.

The processing unit of each of the slave devices comprises an adjustable time delay element which is configured or adapted to delay the output of the response data packets by an adjustable delay period, so that the output of each response data packet output by the respective slave device in response to receipt of a polling data packet having an identifier matching the identifier of the respective slave device is delayed. In other words, the timing of the output of the response data packets by a slave device is determined by the usual processing delay and by the adjustable delay period. It should be noted that the delay is not applied to response data packets received by a slave device on its second data interface from a downstream slave device and forwarded to the first data interface.

For each of the slave devices the delay period is set to a value which depends on the relative position of the respective slave device in the daisy-chain arrangement with respect to the remaining slave devices of the daisy-chain arrangement, but is preferably independent of the identifier of the slave device. The dependence between the value and the relative position is such that the delay period continuously decreases from slave device to slave device starting from the first slave device and ending at the last slave device.

It has been recognized in accordance with the disclosure herein that by configuring the slave devices in the above manner the set-up and reconfiguration of a network having a daisy-chain arrangement is greatly simplified. In particular, it is advantageously possible to arbitrarily order the slave devices in the series of slave devices, independent of their identifiers, because any negative effect of a particular order can be eliminated by a suitable choice of the delay periods of the slave devices. This lowers installation restrictions both at the time of setting up a network for the first time and at times of reconfiguring an existing network, e.g., by adding another slave device. In the latter case it is advantageously possible to add it at an arbitrary location, e.g., as the first slave device connected to the master device, without having to take into consideration the identifiers of the new and existing slave devices. In particular, it is not necessary to reassign identifiers to slave devices depending on the order to the slave devices along the chain, i.e., the identifiers are fixedly assigned to the slave devices. Moreover, it is easily possible to increase the upstream bandwidth, i.e., the proportion of the total time available for the slave devices to transmit data to the master controller by suitably shifting the response time of the individual slave devices. The resulting reduction of idle times also increases power and cost efficiency.

In a preferred embodiment the time delay element of each of the slave devices includes a buffer memory. The processing unit is then configured or adapted to buffer the response data packet in the buffer memory for the respective delay period. The buffering time may be controlled by, e.g., a timer included in or associated with the processing unit.

In an alternative preferred embodiment the time delay element of each of the slave devices is configured or adapted to delay generation of the response data packet by the processing unit by the respective delay period.

Generally, the time delay element may be a physical element or a function implemented in the processing unit.

In a preferred embodiment the processing unit of each of the slave devices is configured or adapted to receive a measure of the relative position of the respective slave device and to automatically determine and set the adjustable delay period as a predetermined function of the received measure. For example, the measure may be received by manual input by an operator or by control data packets transmitted by the master device or another network entity.

However, it is particularly preferred if the slave devices are operable to automatically determine the measure, such as, e.g., the relative position itself. In a preferred embodiment the processing unit of each of the slave devices is configured or adapted to measure the time periods between outputting the polling data packets on the second data interface and receiving the corresponding response data packets, to determine the maximum measured time period and to automatically set the adjustable delay period based on the determined maximum. Due to the fact that the maximum measured time period depends on the number of slave devices between the slave device at issue and the last slave device, i.e., the number of slave devices following the slave device at issue, the maximum measured time period is a measure of the relative position of the respective slave device in the series of slave devices. This measure is particularly simple to determine autonomously by a slave device. Preferably, the processing unit is configured or adapted to set the adjustable delay period to the determined maximum time period, but it may also be advantageous to set it to a higher value, e.g., to a slightly higher value in order to account for possible jitter. Preferably, the above process is carried out continuously or intermittently in order to be able to immediately react to the addition of a slave device, the removal of a slave device, or a malfunction of a slave device. In that case, the slave devices are preferably constructed such that they include a bypass circuit which is activated in case of a malfunction.

In this embodiment it is further preferred if the processing unit of each of the slave devices is configured or adapted to compare the determined delay period with a predefined maximum delay period, and to set the adjustable delay period to the predefined maximum delay period if the determined delay period exceeds the predefined maximum delay period. For example, the predefined maximum delay period may correspond to the time period between successive polling data packets, or may be selected based as a function of a maximum number of slave devices chosen at design time and the time period between successive polling data packets. In this manner it can be prevented that an indefinite delay period is set in the case of an error in the downstream transmission of polling data packets and/or the upstream transmission of the response data packets. The predefined maximum delay period determines the maximum possible number of slave devices, because the maximum response time measured by the slave devices increases when the number of slave devices increases, and may be suitably set at design time. It is particularly preferred if the predefined maximum delay period is smaller than the time interval between successive polling data packets in the sequences of polling data packets.

In a preferred embodiment the processing unit of each of the slave devices is configured or adapted to set the delay period to zero if it is determined on the basis of the measure that the slave device is the last slave device in the series of slave devices.

In a preferred embodiment each sequence of polling data packets includes at the end or at the beginning thereof a special polling data packet including a predefined identifier, which is included in the sequence of identifiers and is not associated with any of the slave devices. The processing unit of each of the slave devices is then configured or adapted to identify the special polling data packets upon receipt on the first data interface, to forward them to the second data interface, but to not output a response data packet. As will be described further below, such special polling data packets may be suitable to prevent collisions of response data packets transmitted by different slave devices in the upstream direction.

In a preferred embodiment the processing unit of each of the slave devices comprises or is a field programmable gate array (FPGA).

The network according to each of the above embodiments may be advantageously part of an aircraft or spacecraft. For example, it can constitute or be part of the aircraft cabin electronic network.

As already explained above, the network having the above configuration and constructions greatly simplifies configuring the network. Accordingly, a method of configuring a network for an aircraft or spacecraft is provided, which comprises providing a network according to any of the above-described embodiments, adding a further slave device to the daisy-chain arrangement at an arbitrary position in the series of slave devices, and setting, for each of the slave devices, the delay period to a value depending on the relative position of the respective slave device in the daisy-chain arrangement with respect to the remaining slave devices of the daisy-chain arrangement, such that the delay period continuously decreases from slave device to slave device starting from the first slave device and ending at the last slave device. The further slave device is of the same above-described construction and configuration as the slave devices already present in the daisy-chain arrangement. In particular, the further slave device has an associated identifier taken from the same predetermined ordered sequence of identifiers and uniquely identifying the further slave device among the plurality of slave devices after having added it to the daisy-chain arrangement.

Further, the present disclosure also provides a method of transmitting data comprising the steps of providing a network having the features of any of the above-described embodiments and of carrying out the various steps described in detail above.

BRIEF DESCRIPTION OF THE DRAWINGS

In the following an exemplary embodiment of the disclosure herein will be described in more detail with reference to the drawings.

DETAILED DESCRIPTION

Figure 1A:
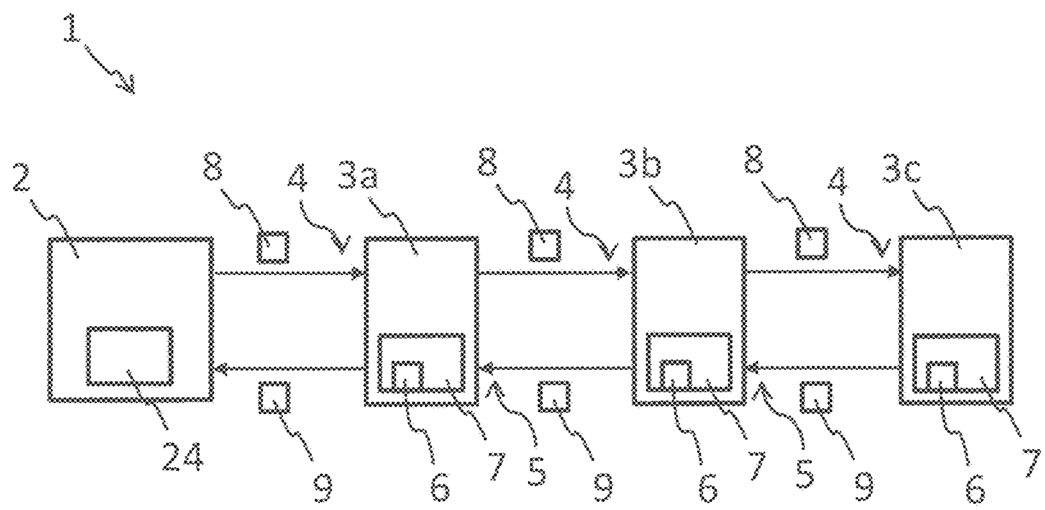
FIG. 1*a* shows a schematic block diagram of a daisy-chain network according to the present disclosure.

The network 1 shown in FIG. 1*a* comprises a master device 2 and a plurality of three slave devices 3*a*, 3*b*, 3*c*. The three slave devices 3*a*, 3*b*, 3*c* are connected in series with the master device 2, such that the slave device 3*a* is directly connected to the master device 2, the slave device 3*b* is connected to the slave device 3*a*, and the slave device 3*c* is in turn connected to the slave device 3*b*. The four devices 2, 3*a*, 3*b*, 3*c* are, thus, connected in series in a daisy-chain arrangement with the master device 2 at the head of the arrangement.

Each of the slave devices 3*a*-3*c* comprises a first data interface 4 and a second data interface 5, by which it is coupled to the adjacent upstream device and the adjacent downstream device, respectively, if available. The downstream direction is the direction of data transmitted by the master device along the daisy-chain arrangement in the direction towards the last slave device 3*c*, and the upstream direction is the direction from the slave devices towards the master device 2. The slave devices 3*a*-3*c* further each include a processing unit 6 which, in turn, comprises a time delay element 7. The processing unit 6 is connected to the first and second data interfaces 4, 5 of the respective slave device 3*a*-3*c*.

Moreover, each of the slave devices 3*a*-3*c* has associated therewith an identifier 10 in the form of, e.g., an integer number. The master device 2, which comprises a processing or control unit 24 configured or adapted to enable it to carry out the various described steps and functions, periodically transmits polling data packets 8, each including an identifier 10 of one of the slave devices 3*a*-3*c*, in order to successively poll one after the other the slave devices 2 in the order determined by their identifiers 10. The processing unit 6 of each of the slave devices 3*a*-3*c* is configured or adapted to determine whether a received polling data packet 8 includes the identifier 10 of the respective slave device 3*a*-3*c*, and to forward the polling data packet 8 to the next slave device 3*a*-3*c* if the identifiers do not match. On the other hand, if they match the processing unit 6 generates a response data packet 9 and transmit it via its first data interface 4 towards the master device 2. The response data packets 9 are forwarded from slave device to slave device to the master device 2 in a manner similar to the manner of forwarding the polling data packets 8. It should be noted that the polling data packets 8 may also be used to transport actual user data from the master device 2 to the slave devices 3*a*, 3*b*, 3*c*. In that case, the arrows representing the polling data packets 8 would have to have a larger width than shown in the drawings, depending on the amount of data transported.

Figure 1B:
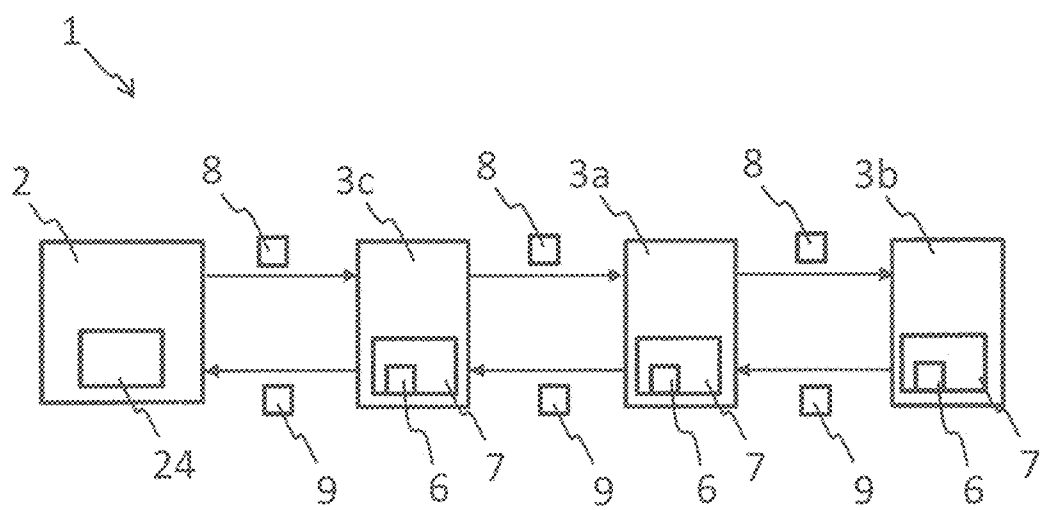
FIG. 1*b* shows a schematic block diagram of the daisy-chain network of FIG. 1*a* after changing the order of the slave devices.

FIG. 1*b* shows the same network after changing the order of the slave devices 3*a*-3*c*.

Figure 2A:
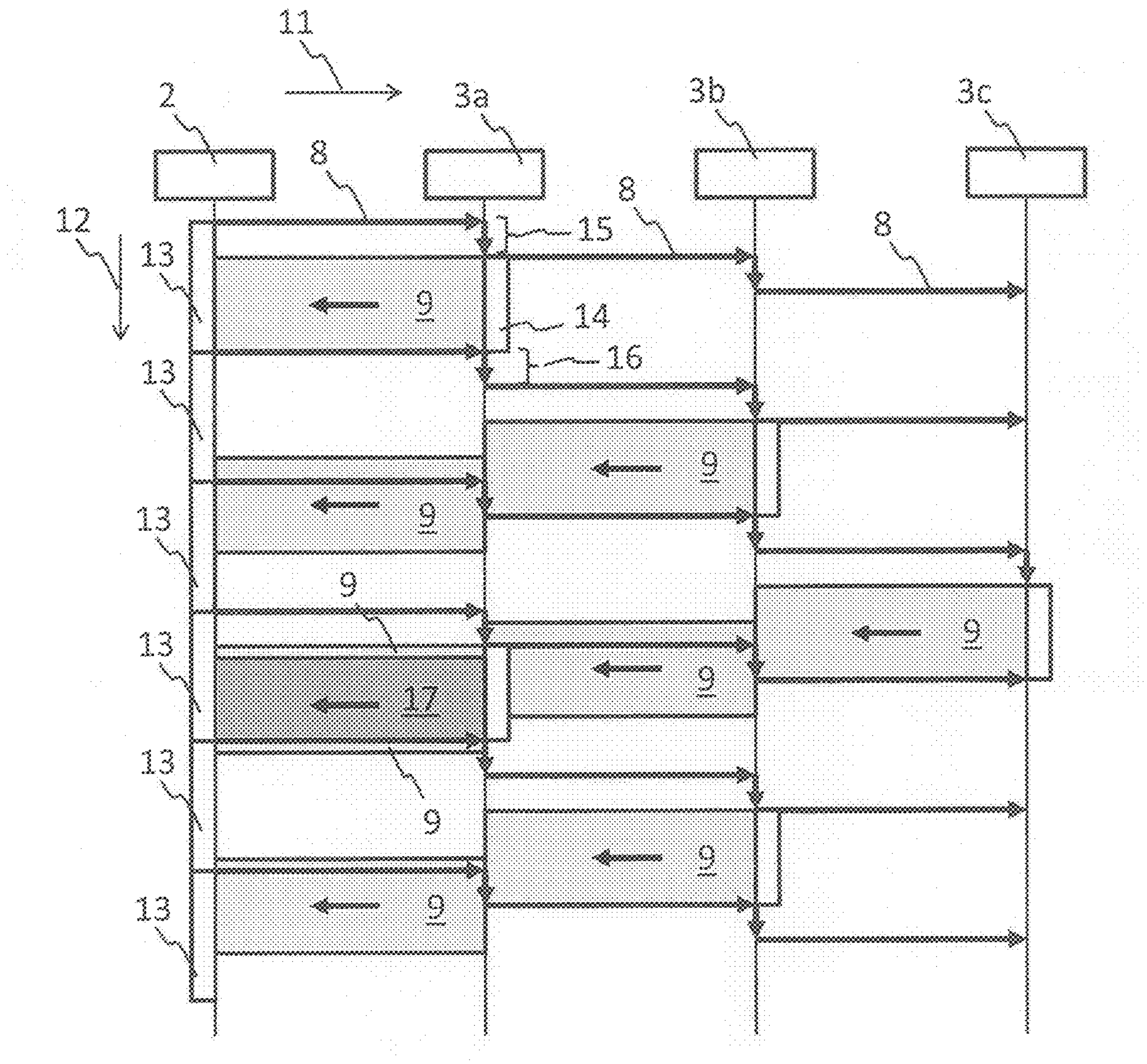
FIG. 2*a* schematically shows a timing diagram of data transmission in the network of FIG. 1*a* with all adjustable delay periods set to zero.

In FIG. 2*a* a timing diagram is shown, in which the horizontal axis 11 indicates the position of the master device 2 and the slave devices 3*a*-3*c* in the daisy-chain arrangement, and the vertical axis 12 is the time axis. As indicated in FIG. 2*a*, the time axis 12 is divided into a plurality of successive time slots 13, at the beginning of each of which the master device 2 transmits a polling data packet 8 along the chain. The first polling data packet includes the identifier 10 of the slave device 3*a* (the identifier in this example is "1"), the second polling data packet includes the identifier 10 of the slave device 3*b* (the identifier in this example is "2"), the third polling data packet includes the identifier 10 of the slave device 3*c* (the identifier in this example is "3"), and then the sequence is repeated for the next polling data packets.

Consequently, the first polling data packet 8 is received by the slave device 3*a*, which recognizes that it is addressed by the first polling data packet 8 and, therefore, generates and transmits a response data packet 9 over a time period 14, which is smaller than the corresponding time slot 13. Due to the processing necessary for the slave device 3*a* to recognize the first polling data packet 8 and to generate the response data packet 9, the transmission of the response data packet 9 is delayed by a processing delay period 15. Further, the first polling data packet 8 is forwarded to the next slave device 3*b* in the manner described below for the second data packet 8 at the first slave device 3*a*.

The second polling data packet 8 is likewise received by the slave device 3*a*, which recognizes, however, that it is addressed by the second polling data packet 8 and, therefore, does not generate and transmit a response data packet 9. Rather, the second polling data packet 8 is forwarded to the slave device 3*b*, which is the next slave device in the series of slave devices 3*a*-3*c*. Due to the processing necessary for the slave device 3*a* to recognize the second polling data packet 8 and to effect forwarding, the transmission of the second polling data packet 8 by the slave device 3*a* is delayed by a hop delay period 16, which, in the example shown is identical to the processing delay 15. The same hop delay 16 also occurs in the opposite direction when forwarding the response data packets 9 by a slave device 3*a*-3*c*.

Similar considerations apply to all subsequent polling data packets 8, so that delays accumulate along the chain and response data packets 9 have a travel time—with respect to the moment in time the polling data packet 8 initiating the response data packet 9 was received at the respective slave device 3*a*-3*c*—which is higher the further down the chain the slave device 3*a*-3*c* is located, which generated and transmitted the respective response data packet 9.

Therefore, as illustrated in FIG. 2*a*, the response data packet 9 transmitted by the slave device 3*a* in response to the fourth polling data packet 8 collides with the response data packet 9 transmitted earlier by the slave device 3*c* in response to the third polling data packet 8. The collision zone 17 is indicated by dark shading.

Figure 2B:
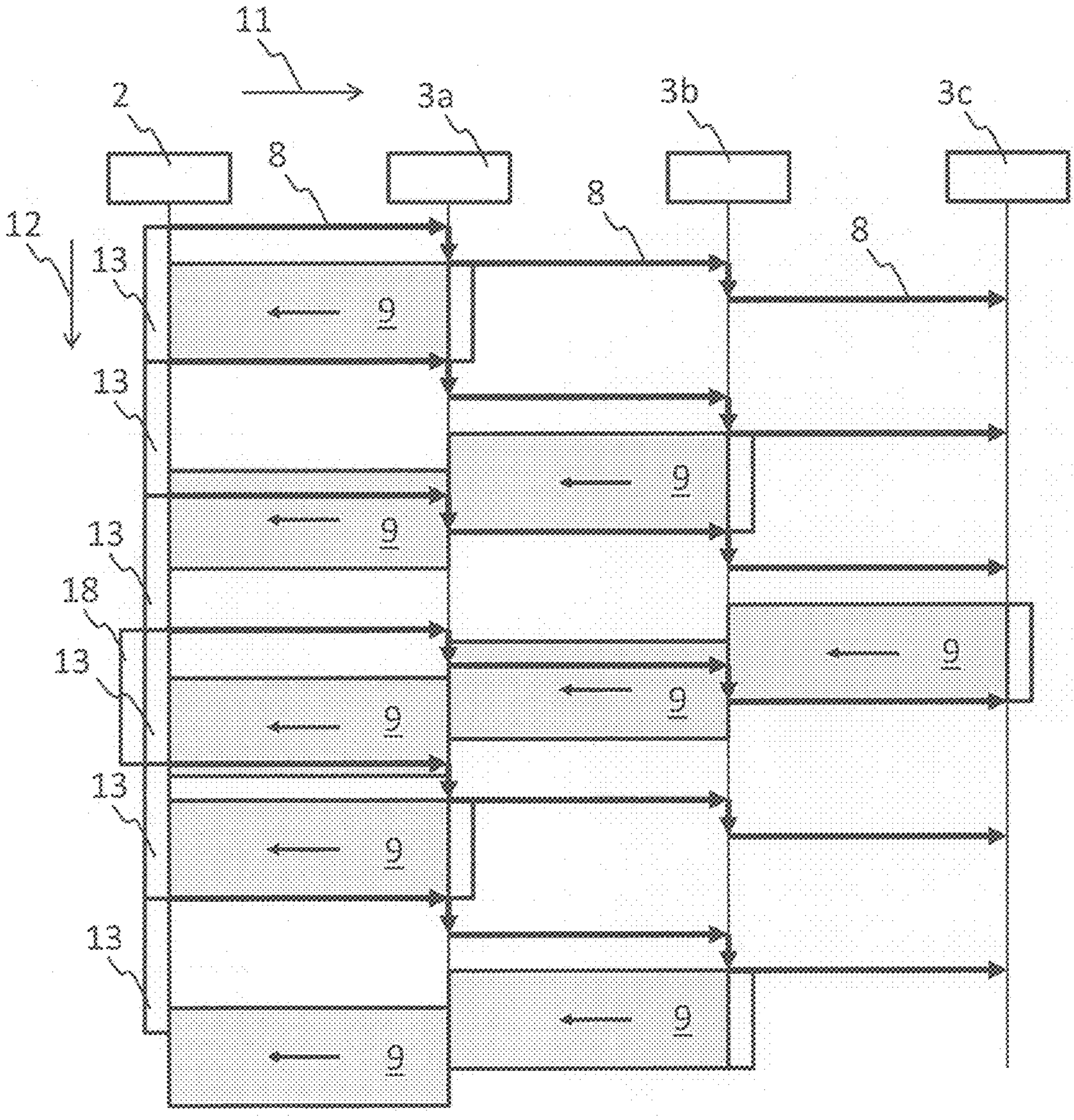
FIG. 2*b* schematically shows a further timing diagram of data transmission in the network of FIG. 1*a* with all adjustable delay periods set to zero, but with a special polling data packet being transmitted between successive sequences of polling data packets.

As illustrated in FIG. 2*b*, the collision 17 can be avoided in this example by adding a special time slot 18, at the beginning of which a polling data packet 8 addressed to none of the slave devices 3*a*-3*c* is transmitted, so that none of the slave devices 3*a*-3*c* respond thereto. For example the special polling data packet 8 may include the identifier "0".

Figure 3A:
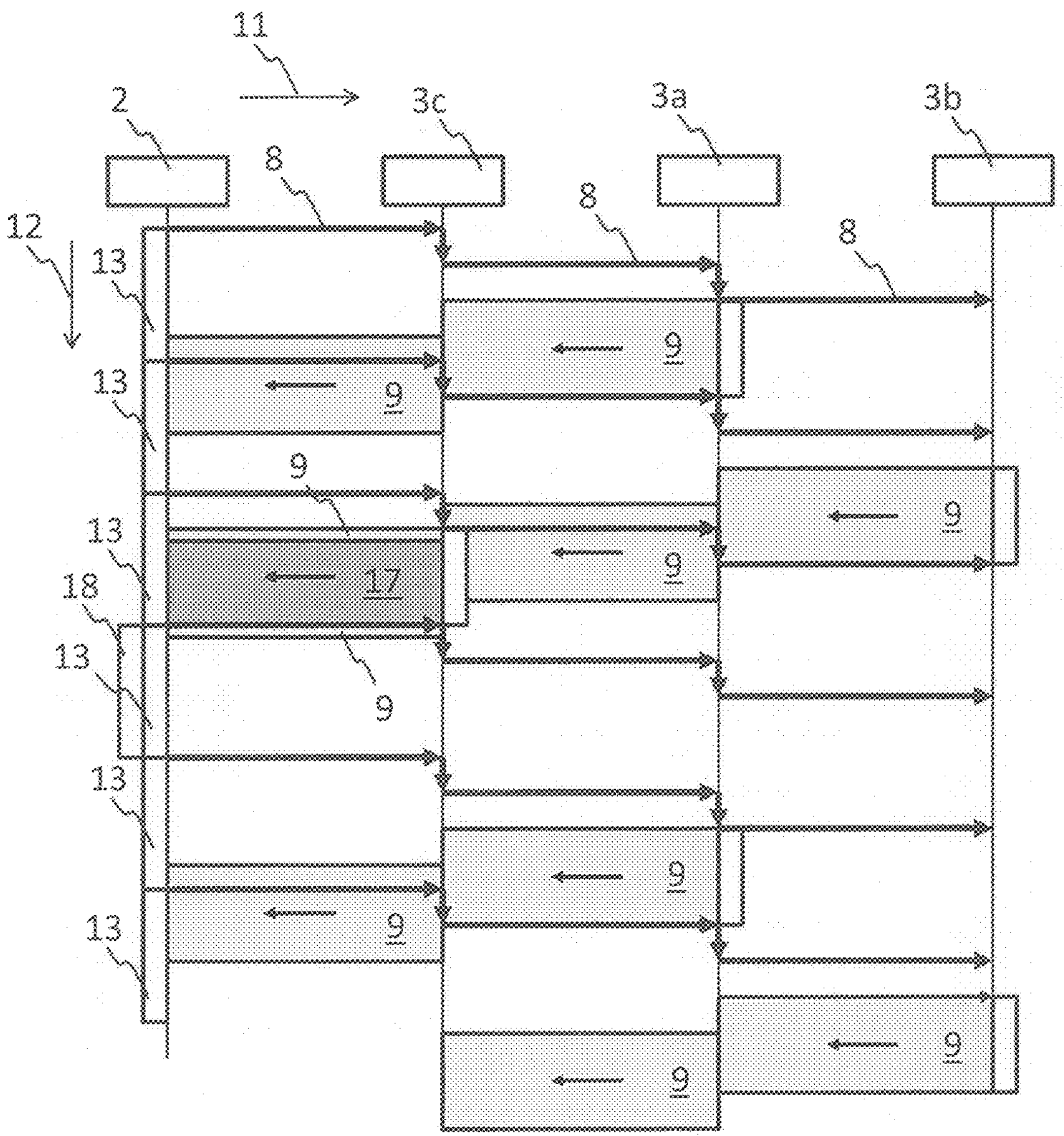
FIG. 3*a* schematically shows a timing diagram of data transmission in the network of FIG. 1*b* with all adjustable delay periods set to zero, and with a special polling data packet being transmitted between successive sequences of polling data packets, as in the case of FIG. 2*a*.

However, as illustrated in FIG. 3*a*, the special time slot 18 does not serve to prevent a collision 17 if the order of the slave devices 3*a*-3*c* is changed to the one shown in FIG. 1*b*.

Figure 3B:
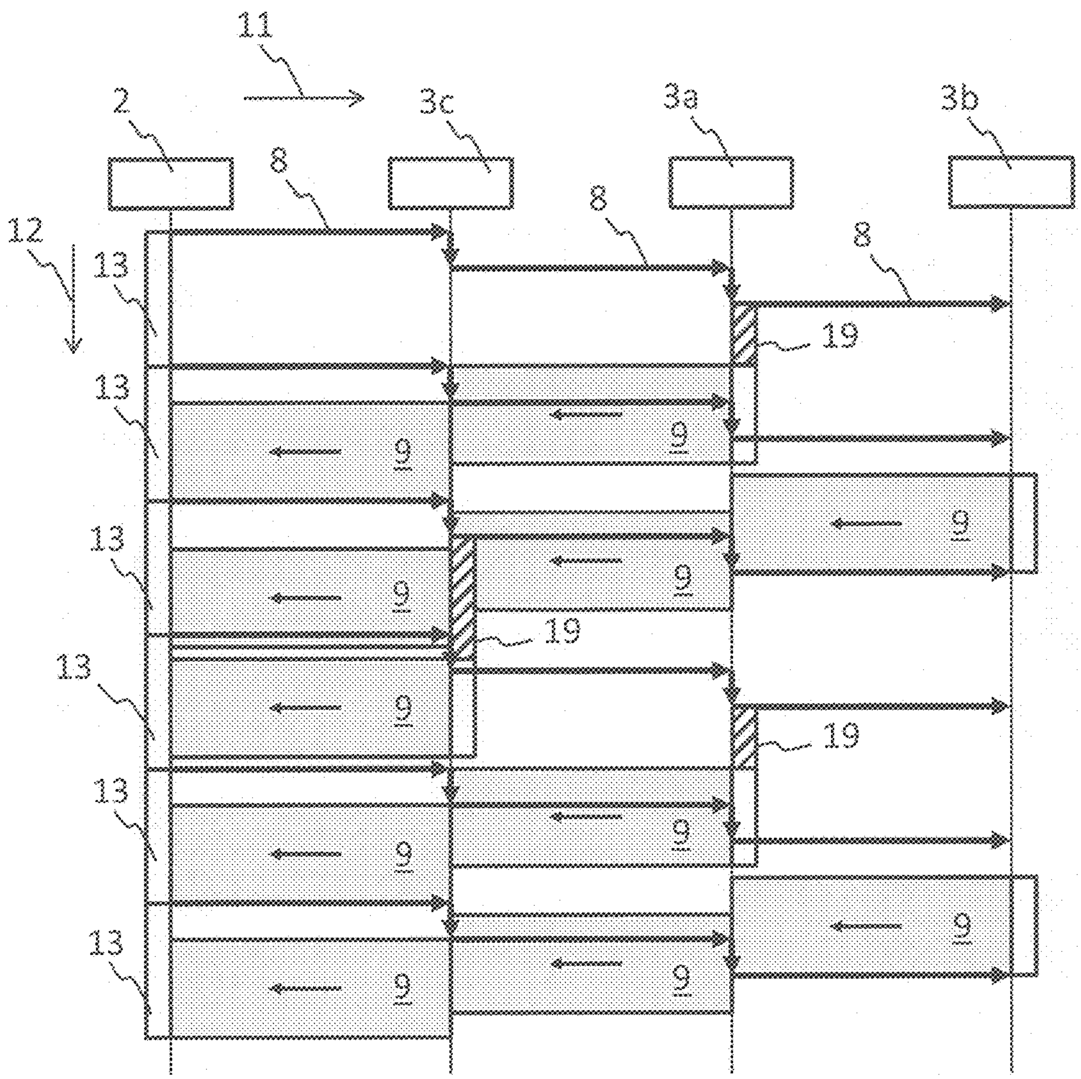
FIG. 3*b* schematically shows a timing diagram of data transmission in the network of FIG. 1*b* with all adjustable delay periods set to zero, and with a special polling data packet being transmitted between successive sequences of polling data packets, as in the case of FIG. 3*a*, but with the adjustable delay periods set to non-zero values in accordance with an embodiment of the disclosure herein.

Therefore, the adjustable delay element 7 included in each of the processing units 6 is adjusted for each of the slave devices 3*a*-3*c* such that before transmitting the generated response data packet 9 the processing unit 6 waits for an adjustable delay period 19. The adjustment is made in such a manner that for the first slave device 3*c* in the daisy-chain arrangement when viewed from the master device 2 the largest delay period 19 is chosen, and the delay period 19 continuously decreases along the chain until it is zero for the last slave device 3*b*. As can be seen in FIG. 3*b*, any collision is prevented, in the example illustrated even without providing for a special time slot. Further, the use of the available upstream bandwidth is considerably increased as compared to FIGS. 2*a*, 2*b* and 3*a*, because the upstream transmissions are shifted in time to be spaced closer to each other.

Figure 4:
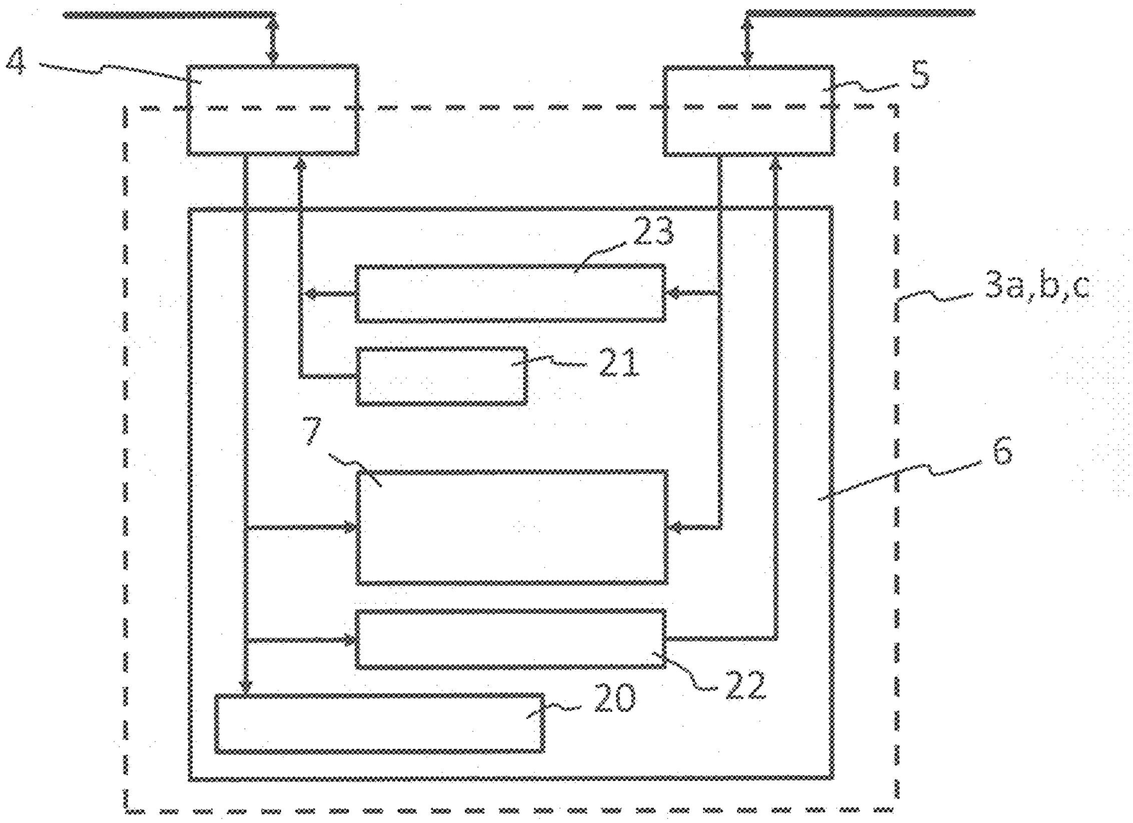
FIG. 4 shows a schematic block diagram of a slave device of the networks of FIGS. 1*a* and 1*b*.

FIG. 4 shows a schematic block diagram of an embodiment of a slave device 3*a*, 3*b*, 3*c* including the processing unit 6 implemented as a field programmable gate array (FPGA), and comprising the first data interface 4 and the second data interface 5, by which it is coupled to the chain in the upstream direction and the downstream direction, respectively, i.e., to one or more data lines extending between the respective slave device 3*a*, 3*b*, 3*c* and the immediately adjacent device or devices 2, 3*a*, 3*b*, 3*c*.

The processing unit 6 includes a receiving element 20 configured or adapted to receive data from the chain and a transmitting element 21 configured or adapted to transmit data on the chain. Received polling data packets 8 not addressed to the slave device 3*a*, 3*b*, 3*c* are simply forwarded in the downstream direction by a downstream forwarding element 22, and response data packets 9 received from downstream slave devices are forwarded in the upstream direction by an upstream forwarding element 23. Further, the time delay element 7, which is included in this example in the processing unit 6, determines for each received polling data packet 8 not addressed to the slave device 3*a*, 3*b*, 3*c* and forwarded in the downstream direction whether a corresponding response data packet 9 is received and what is the delay between forwarding the polling data packet 8 and receiving the response data packet 9. The time delay element 7 is configured or adapted to determine the maximum delay, to set the delay period 19 as described above, and to control the transmitting element 21 to delay transmission of response data packets 9 generated by the slave device 3*a*, 3*b*, 3*c* by the set delay period 19.

Figure 5:
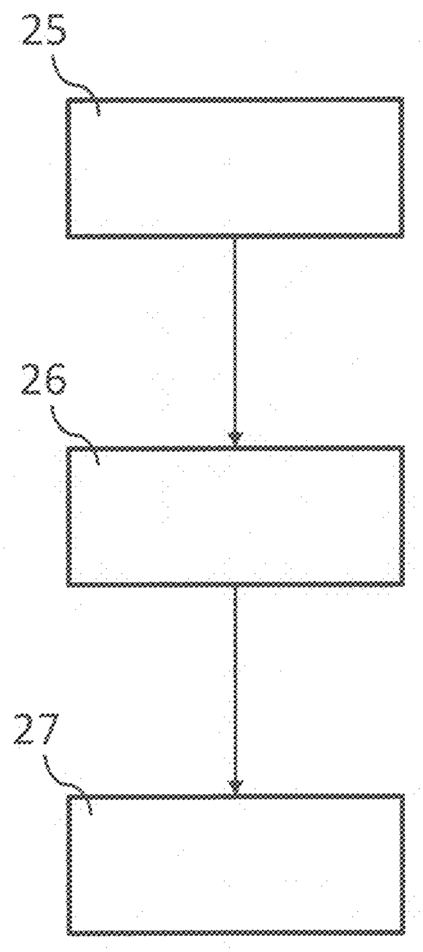
FIG. 5 is a flow diagram of a method for configuring a network.

FIG. 5 is a flow diagram schematically illustrating a method of configuring a network for an aircraft or spacecraft. In step 25 a network 1 having the above-described configuration is provided. In step 26 a further slave device (3*a*, 3*b*, 3*c*) is added to the daisy-chain arrangement at an arbitrary position in the series of slave devices (3*a*, 3*b*, 3*c*). The further slave device (3*a*, 3*b*, 3*c*) is of the same above-described construction and configuration as the slave devices (3*a*, 3*b*, 3*c*) already present in the daisy-chain arrangement. In particular, the further slave device (3*a*, 3*b*, 3*c*) has an associated identifier taken from the same predetermined ordered sequence of identifiers and uniquely identifying the further slave device (3*a*, 3*b*, 3*c*) among the plurality of slave devices (3*a*, 3*b*, 3*c*), including the ones already added it to the daisy-chain arrangement. In step 27, for each of the slave devices (3*a*, 3*b*, 3*c*), the delay period (19) is set in the above-described manner to a value depending on the relative position of the respective slave device (3*a*, 3*b*, 3*c*) in the daisy-chain arrangement with respect to the remaining slave devices (3*a*, 3*b*, 3*c*) of the daisy-chain arrangement, such that the delay period (19) continuously decreases from slave device (3*a*, 3*b*, 3*c*) to slave device (3*a*, 3*b*, 3*c*) starting from the first slave device (3*a*, 3*b*, 3*c*) and ending at the last slave device (3*a*, 3*b*, 3*c*).

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A network for an aircraft or spacecraft, comprising:

a master device and a plurality of slave devices connected in series in a daisy-chain arrangement, wherein the master device is connected to a first slave device of the plurality of slave devices, to which remaining slave devices are connected in series up to a last slave device of the plurality of slave devices, and wherein each of the plurality of slave devices has an associated identifier taken from a predetermined ordered sequence of identifiers and uniquely identifying a respective slave device among the plurality of slave devices;

wherein the master device is configured to transmit periodically one or more polling data packets in a downstream direction along the plurality of slave devices, each of the one or more polling data packets including one identifier, wherein the master device is configured to transmit the one or more polling data packets in successive sequences, each sequence of the one or more polling data packets including for each of the plurality of slave devices one polling data packet, which includes an identifier correlating to the associated identifier of the respective slave device, and each sequence of the one or more polling data packets including the one or more polling data packets in an order defined by the predetermined ordered sequence of identifiers, and each of the plurality of slave devices comprising a first data interface by which it is connected to the master device or to an adjacent slave device in an upstream direction, a second data interface by which it is connected to an adjacent slave device in the downstream direction, and a processing unit connected to the first data interface and the second data interface and configured to:

compare for each one of the one or more polling data packets received on the first data interface the associated identifier of the respective slave device with the identifier included in the one of the one or more polling data packets, and output on the first data interface a response data packet to the master device if the associated identifier of the respective slave device and the identifier included in the one of the one or more polling data packets match, and forward the one of the one or more polling data packets to the second interface at least if the associated identifier of the respective slave device and the identifier included in the one of the one or more polling data packets do not match; and forward response data packets received on the second data interface to the first data interface;

wherein the processing unit of each of the plurality of slave devices comprises an adjustable time delay element which is configured to delay the output of the response data packets by an adjustable delay period; and wherein for each of the plurality of slave devices the delay period is set to a value depending on a relative position of the respective slave device in the daisy-chain arrangement with respect to the remaining slave devices of the daisy-chain arrangement, such that the delay period continuously decreases from slave device to slave device starting from the first slave device and ending at the last slave device.

2. The network according to claim 1, wherein the time delay element of each of the plurality of slave devices includes a buffer memory, wherein the processing unit of each of the plurality of slave devices is configured to buffer the response data packet in the buffer memory for the respective delay period, or the time delay element of each of the slave devices is configured to delay generation of the response data packet by the processing unit of each of the plurality of slave devices by the respective delay period.

3. The network according to claim 1, wherein the processing unit of each of the plurality of slave devices is configured to receive a measure of the relative position of the respective slave device and to automatically determine and set the adjustable delay period as a predetermined function of the received measure.

4. The network according to claim 3, wherein the processing unit of each of the plurality of slave devices is configured to measure the time periods between outputting the one or more polling data packets on the second data interface and receiving the corresponding response data packets, to determine a maximum measured time period and to automatically set the adjustable delay period based on the determined maximum.

5. The network according to claim 4, wherein the processing unit of each of the plurality of slave devices is configured to set the adjustable delay period to the determined maximum time period.

6. The network according to claim 3, wherein the processing unit of each of the plurality of slave devices is configured to compare the determined delay period with a predefined maximum delay period, and to set the adjustable delay period to the predefined maximum delay period if the determined delay period exceeds the predefined maximum delay period.

7. The network according to claim 1, wherein the processing unit of each of the plurality of slave devices is configured to set the delay period to zero if it is determined on a basis of the measure that the respective slave device is the last slave device in the daisy-chain arrangement.

8. The network according to claim 1, wherein each sequence of the one or more polling data packets includes at an end or at a beginning thereof a special polling data packet including a predefined identifier, which is included in the sequence of identifiers and is not associated with any of the plurality of slave devices, and wherein the processing unit of each of the plurality of slave devices is configured to identify the special polling data packet upon receipt on the first data interface, and to forward them to the second data interface.

9. The network according to claim 1, wherein the processing unit of each of the plurality of slave devices comprises or is a field programmable gate array (FPGA).

10. An aircraft or spacecraft comprising a network according to claim 1.

11. A method of configuring a network for an aircraft or spacecraft, comprising:

providing a network comprising:

a master device and a plurality of slave devices connected in series in a daisy-chain arrangement, wherein the master device is connected to a first slave device of the plurality of slave devices, to which remaining slave devices are connected in series up to a last slave device of the plurality of slave devices, and wherein each of the plurality of slave devices has an associated identifier taken from a predetermined ordered sequence of identifiers and uniquely identifying a respective slave device among the plurality of slave devices;

wherein the master device is configured to transmit periodically one or more polling data packets in a downstream direction along the plurality of slave devices, each of the one or more polling data packets including one identifier, wherein the master device is configured to transmit the one or more polling data packets in successive sequences, each sequence of the one or more polling data packets including for each of the plurality of slave devices one polling data packet, which includes an identifier correlating to the associated identifier of the respective slave device, and each sequence of the one or more polling data packets including the one or more polling data packets in an order defined by the predetermined ordered sequence of identifiers, and each of the plurality of slave devices comprising a first data interface by which it is connected to the master device or to an adjacent slave device in an upstream direction, a second data interface by which it is connected to an adjacent slave device in the downstream direction, and a processing unit connected to the first data interface and the second data interface and configured to:

compare for each one of the one or more polling data packets received on the first data interface the associated identifier of the respective slave device with the identifier included in the one of the one or more polling data packets, and output on the first data interface a response data packet to the master device if the associated identifier of the respective slave device and the identifier included in the one of the one or more polling data packets match, and forward the one of the one or more polling data packets to the second interface at least if the associated identifier of the respective slave device and the identifier included in the one of the one or more polling data packets do not match; and forward response data packets received on the second data interface to the first data interface;

wherein the processing unit of each of the plurality of slave devices comprises an adjustable time delay element which is configured to delay the output of the response data packets by an adjustable delay period; and wherein for each of the plurality of slave devices the delay period is set to a value depending on a relative position of the respective slave device in the daisy-chain arrangement with respect to the remaining slave devices of the daisy-chain arrangement, such that the delay period continuously decreases from slave device to slave device starting from the first slave device and ending at the last slave device;

adding a further slave device to the daisy-chain arrangement at an arbitrary position in the series of slave devices; and setting, for each of the slave devices, the delay period to a value depending on the relative position of the respective slave device in the daisy-chain arrangement with respect to the remaining slave devices of the daisy-chain arrangement, such that the delay period continuously decreases from slave device to slave device starting from the first slave device and ending at the last slave device.

* * * * *